US010991063B2

(12) United States Patent
Klenk et al.

(10) Patent No.: US 10,991,063 B2
(45) Date of Patent: Apr. 27, 2021

(54) SYSTEM AND METHOD FOR OPTIMIZATION OF ON-DEMAND MICROTRANSIT

(71) Applicant: CONDUENT BUSINESS SERVICES, LLC, Florham Park, NJ (US)

(72) Inventors: Matthew E. Klenk, San Francisco, CA (US); Christian Fritz, Menlo Park, CA (US); Rong Yang, Sunnyvale, CA (US)

(73) Assignee: CONDUENT BUSINESS SERVICES, LLC, Florham Park, NJ (US)

( * ) Notice: Subject to any disclaimer, the term of this patent is extended or adjusted under 35 U.S.C. 154(b) by 191 days.

(21) Appl. No.: 15/250,706

(22) Filed: Aug. 29, 2016

(65) Prior Publication Data
US 2018/0060988 A1     Mar. 1, 2018

(51) Int. Cl.
*G06Q 50/30*     (2012.01)
*G06Q 10/06*     (2012.01)
(Continued)

(52) U.S. Cl.
CPC ....... *G06Q 50/30* (2013.01); *G06Q 10/06311* (2013.01); *G08G 1/202* (2013.01);
(Continued)

(58) Field of Classification Search
CPC ............. G06Q 50/30; G06Q 10/06311; G06Q 10/047; G08G 1/202
See application file for complete search history.

(56) References Cited

U.S. PATENT DOCUMENTS 6,240,362 B1 *  5/2001  Gaspard, II ......... G01C 21/343
                                                      340/991
8,972,185 B1 *  3/2015  Viger ................ G01C 21/3423
                                                      701/533
(Continued)

OTHER PUBLICATIONS

Zhang, R. (2016). Models and large-scale coordination algorithms for autonomous mobility-on-demand (Order No. 28118542). Available from ProQuest Dissertations and Theses Professional. (2454429305). Retrieved from https://dialog.proquest.com/professional/docview/2454429305?accountid=161862 (Year: 2016).*
(Continued)

*Primary Examiner* — Patricia H Munson
*Assistant Examiner* — Nicholas D Bolen
(74) *Attorney, Agent, or Firm* — Patrick J. S. Inuoye; Leonid Kisselev

(57) ABSTRACT

A system and method for optimization of on-demand microtransit is provided. A list of possible stops of one or more vehicles is maintained. A plurality of requests for transportation are received, each of the requests associated with at least one traveler. Travelers to be transported by one of the vehicles are selected. A set of a minimal number of the stops is selected, the set comprising at least one stop that is within a predefined walking distance of the origin location of each of the selected travelers and at least one stop within the predefined walking distance of the destination location of each of the selected travelers. Potential routes are identified for the vehicle that include the stops in the set. The potential routes are evaluated using a plurality of constraints and one of the routes is selected for fulfilling the requests of the selected travelers.

12 Claims, 6 Drawing Sheets

(51) Int. Cl.
  *G08G 1/00* (2006.01)
  *G06Q 10/04* (2012.01)
  *G07B 15/02* (2011.01)
  *G01C 21/34* (2006.01)
(52) U.S. Cl.
  CPC ....... *G01C 21/3438* (2013.01); *G06Q 10/047* (2013.01); *G07B 15/02* (2013.01)

(56) References Cited

U.S. PATENT DOCUMENTS

| | | | | |
|---|---|---|---|---|
| 10,572,847 | B2* | 2/2020 | Ho | H04L 67/36 |
| 2007/0168236 | A1* | 7/2007 | de Marcken | G06Q 10/047 |
| | | | | 705/5 |
| 2011/0112759 | A1* | 5/2011 | Bast | G01C 21/34 |
| | | | | 701/533 |
| 2012/0124592 | A1* | 5/2012 | Kummamuru | H04L 67/327 |
| | | | | 718/104 |
| 2014/0089036 | A1* | 3/2014 | Chidlovskii | G06Q 10/06315 |
| | | | | 705/7.27 |
| 2014/0172727 | A1* | 6/2014 | Abhyanker | G06Q 30/0645 |
| | | | | 705/307 |
| 2017/0169377 | A1* | 6/2017 | Liu | G06Q 10/06315 |
| 2017/0330112 | A1* | 11/2017 | Chidlovskii | G06Q 30/0202 |
| 2018/0017405 | A1* | 1/2018 | Chen | H04W 4/02 |

OTHER PUBLICATIONS

Jaffe, E., How the Microtransit Movement is Changing Urban Mobility, 2015.

Viechnicki et al., Smart Mobility: Reducing Congestion and Fostering Faster, Greener, and Cheaper Transportation Options, 2015.

Toth et al., The Vehicle Routing Problem. Society for Industrial and Applied Mathematics, pp. 1-26, 2001.

Cici et al., Assessing the Potential of Ride-Sharing Using Mobile and Social Data: A Tale of Four Cities. In Proceedings of the 2014 ACM International Joint Conference on Pervasive and Ubiquitous Computing, ACM, New York, NY, USA, 2014, UbiComp '14, pp. 201-211.

Jung et al., Dynamic Shared-Taxi Dispatch Algorithm with Hybrid-Simulated Annealing. Computer-Aided Civil and Infrastructure Engineering, 2015.

Kamar et al., Collaboration and Shared Plans in the Open World: Studies of Ridesharing. In IJCAI, 2009, vol. 9, p. 187.

Amey et al., Real-Time Ridesharing: Exploring the Opportunities and Challenges of Designing a Technology-Based Rideshare Trial for the MIT community. Ph.D. thesis, Massachusetts Institute of Technology, 2010.

MacQueen et al., Some Methods for Classification and Analysis of Multivariate Observations. In Proceedings of the Fifth Berkeley Symposium on Mathematical Statistics and Probability, Oakland, CA, USA, 1967, vol. 1. pp. 281-297.

Haklay et al., Openstreetmap: User-Generated Street Maps. Pervasive Computing, IEEE, vol. 7, No. 4, 2008, pp. 12-18.

Stein et al., Sage Mathematics Software (Version 6.7.0), The Sage Development Team, 2015, http://www.sagemath.org.

Agatz et al., Optimization for Dynamic Ride-Sharing: A Review. European Journal of Operational Research, vol. 223, No. 2, 2012, pp. 295-303.

Melkote et al., An Integrated Model of Facility Location and Transportation Network Design. Transportation Research Part A: Policy and Practice, vol. 35, No. 6, 2001, pp. 515-538.

Google, General Transit Feed Specification Reference, 2010.

* cited by examiner

SYSTEM AND METHOD FOR OPTIMIZATION OF ON-DEMAND MICROTRANSIT

FIELD

This application relates in general to optimizing transportation, and in particular to a system and method for optimization of on-demand microtransit.

BACKGROUND

Microtransit is part of the larger trend of ride-sharing services, for which market analysts estimate potential reductions of 23,000 traffic accidents and 9.1 million metric tons $CO_2$ as well as an annual savings of $30 billion. Microtransit provides a new transportation offering in urban areas that fills the spectrum between private automobiles and large, fixed-route, public transit. A traveler using microtransit can utilize a mobile device, such as a smartphone, to request transportation from and to particular locations at particular times. A micro-transit provider will direct the traveler to walk to a particular vehicle stop, such as a public transportation station, where the traveler will be picked up by a vehicle directed by the provider. The vehicle drives the traveler to another microtransit stop, from where the traveler can walk to a desired location. While microtransit providers pick up and drop off passengers at fixed points, like public transit, the use of mobile devices to request rides and provide payment enables providers to operate without fixed timetables or routes.

As there are no fixed schedules, significant variation can exist in the order that vehicles of a micro-transit provider visit the stops and the order in which the passengers are picked up, resulting in potential for waste of resources, such as fuel, time, and the microtransit vehicles not being utilized to the fullest possible extent for giving rides to as many travelers as possible. This service optimization challenge is further exacerbated as the area to be serviced increases, which requires accounting for more microtransit vehicles, more stops, and more travel requests.

Multiple microtransit providers currently exist. For example, current microtransit providers include companies like Bridj® (operated by GroupZOOM, Inc. of Boston, Mass.) and Chariot™ Transit Inc. of San Francisco, Calif. that run commuter shuttles in Boston and the Bay Area respectively, as well as ride-sharing services of Uber® Technologies Inc. of San Francisco, Calif. and Lyft, Inc. of San Francisco, Calif., as well corporate shuttles designed to meet the first/last-mile problem of commuter rail systems. However, existing microtransit providers appear to be lacking a definite approach to minimizing waste during the provision of their services and appear to be assigning vehicles to particular routes for transporting particular travelers on an ad-hoc basis.

While others have attempted to address the challenge of optimizing ride-sharing services in a systematic way, these efforts have not yet resulted in vehicle and request management model that is adequate for being applied to large areas being serviced. For example, Agatz et al "Optimization for dynamic ride-sharing: A review," European Journal of Operational Research, Vol. 223, No. 2, 2012, pp. 295-303, the disclosure of which is incorporated by reference, surveys several academic models relating to ride-sharing support and recognizes that a challenge of providing an optimization approach that is fast enough to be workable in a major metropolitan area remains unaddressed.

Accordingly, there is a need for a fast way to optimize on-demand microtransit.

SUMMARY

The system and method described below allow to optimize microtransit vehicle assignment management by formalizing microtransit operations as a mixed integer linear problem. A set of heuristics is employed to reduce the search space of possible routes, improve assignments of travelers to particular microtransit vehicles, and reduce the driving time spent transporting the travelers, making the system and method applicable to optimizing microtransit services over a large geographical area.

An embodiment provides a system and method for optimization of on-demand microtransit. A list of possible stops of one or more vehicles is maintained. A plurality of requests for transportation are received, each of the requests associated with at least one traveler and comprising an origin location, a desired destination location, an earliest permitted departure time from the origin location and a latest permitted arrival time to the destination. Travelers to be transported by one of the vehicles are selected. A set of a minimal number of the stops is selected, the set comprising at least one stop that is within a predefined walking distance of the origin location of each of the selected travelers and at least one stop within the predefined walking distance of the destination location of each of the selected travelers. Potential routes are identified for the vehicle that include the stops in the set. The potential routes are evaluated using a plurality of constraints and selecting one of the routes for fulfilling the requests of the selected travelers based on the evaluation.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Optimization of a service provided by a microtransit provider can be achieved by formalizing the operations of a microtransit provider as a mixed integer linear program that can be solved in real time using publicly available data. The objective function can be defined in terms of three variables: total number of travelers U served by the provider; total travel time T of the provider's vehicles; and total walking distances W of all the travelers served by the provider. The number of travelers served is an indication of the revenue of the provider as the providers usually charge a flat fare), while the travel time captures direct cost to the provider. The distance each traveler must walk is a measurement of service quality. The objective function can be expressed using the equation 1 below:

$$\omega_1 \times U + \omega_2 \times T + \omega_3 \times W, \quad (1)$$

with $\omega_2, \omega_2, \omega_3$ being weights that are put on each of the variables in calculating the objective function. Thus, $\omega_1$ can be a large positive value, $\omega_2$ a positive value smaller than $\omega_1$, and $\omega_3$ can be a negative value whose magnitude is smaller than the magnitude of $\omega_2$. Thus, in one embodiment, $\omega_1$ can be 100, $\omega_2$ can be 0.1, and $\omega_3$ be −0.05. In a further embodiment, the values could be different; for example, if the provider values quality of service more than the cost, the magnitude of $\omega_3$ can be increased compared to $\omega_1$. Using the objective function and striving to maximize the value of that function, the provider can evaluate the degree of route optimization.

Figure 1:
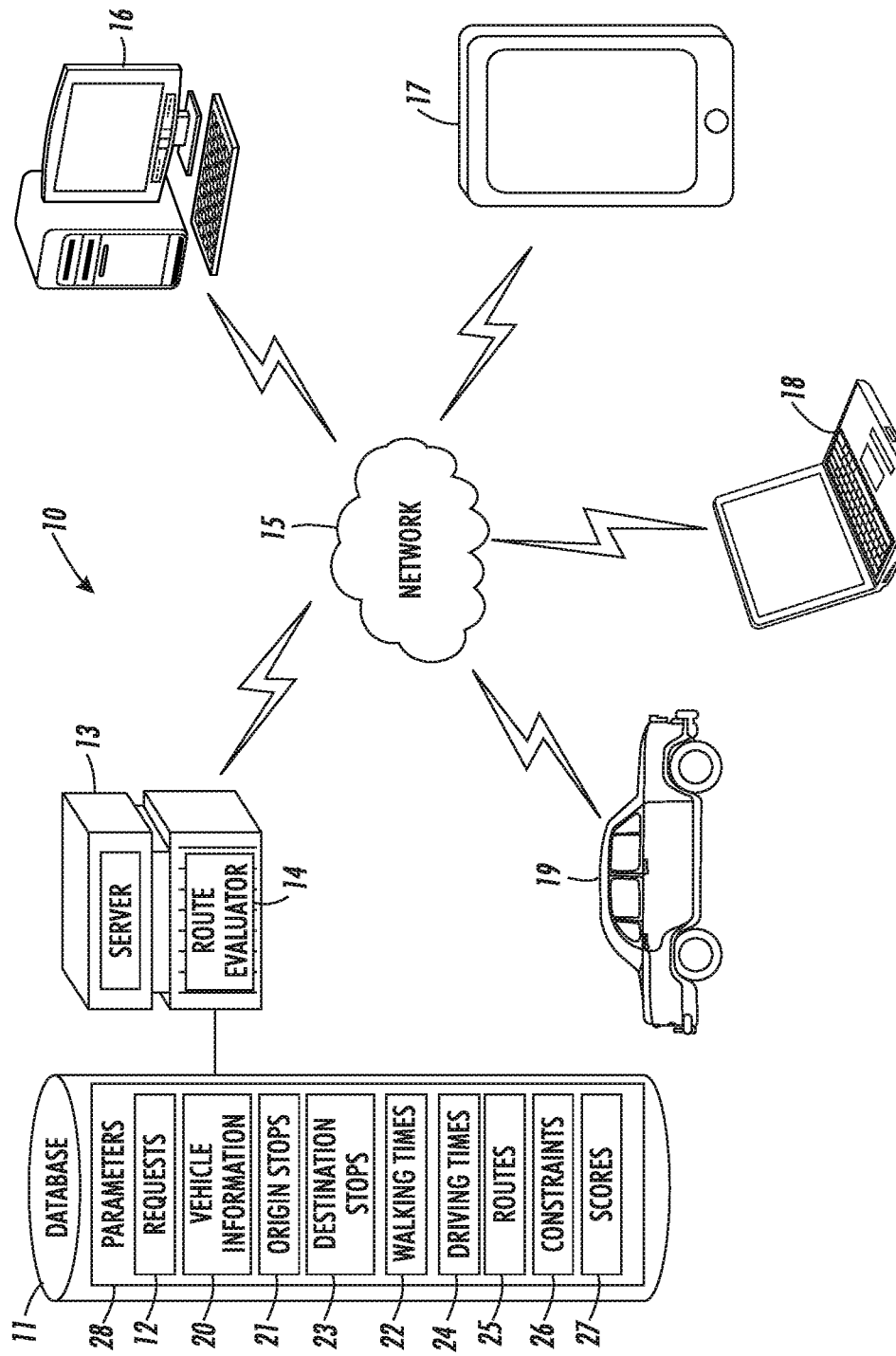
FIG. 1 is a block diagram showing a computer-implemented system for optimization of on-demand microtransit in accordance with one embodiment.

The use of an objective function along with a set of heuristics allows to perform computationally fast assignment of vehicles to particular routes and to transporting particular travelers at the same time as minimizing driving time and increase the number of passengers being serviced. FIG. 1 is a block diagram showing a computer-implemented system 10 for optimization of on-demand microtransit in accordance with one embodiment. The system 10 includes a database storing input parameters 28 for analysis resulting in assigning travelers to be picked up and dropped off by particular vehicles at particular times at particular stops. The formal definitions of the parameters 28 are given below in Table 1:

TABLE 1

Definition of the input parameters

| Parameters | Definition |
|---|---|
| $\{<o_i, e_i, t_i^d, t_i^a>\}$ | The set of request from travelers. For traveler i, $o_i$ and $e_i$ denote the start and target locations, and $t_i^d$ and $t_i^a$ denote that departure and arrival time |
| $\{C_l\}$ | The capacity of each vehicle |
| $\{s_m^p\}$ | The set of station locations where travelers can be picked up |
| $\{s_n^d\}$ | The set of station locations where the travelers can be dropped off |
| dis(.,.) | The walking distance between two locations |
| tra(.,.) | The driving time to get to a station given a route |
| R = {r} | The set of routes that the vehicles can chose from, where $r_0$ is the null route |

The database 11 is coupled to at least one server 13 executing a route evaluator 14 and that is connected to a network 15, such as the Internet or a cellular network, though other kinds of networks 15 are possible. Through the network 15, the server 13 can communicate with user devices 16, 17, 18, which can be mobile devices such as a smartphone (not shown), a tablet 18, or a laptop 18, or a stationary devices such as a desktop 16, though still other kinds of user devices. The devices 16-18 can be executing a dedicated application or communicating with the server 13 in other ways, such as through an Internet Browser. From the user devices 6-18, the server 13 receives requests 12 for transportation, which are stored in the database 11 as part of the parameters 28. Each of the requests 12 is associated with at least at least one traveler and is provided in the form (o, e, $t^d$, $t^a$), where o is the origin location, e is the destination location, $t^d$ is the earliest departure time of the traveler, and $t^a$ is the latest time the traveler wants to arrive at the destination location.

The at least one server 13 can interact via the network 15 with autonomous self-driving vehicles 19 (such as through wireless transceivers included in the vehicles 19) and assign a route for these vehicles to automatically follow. The database 11 further stores vehicle information 20 for vehicles, including the self-driving vehicles 19, under the direction of the microtransit provider, such as the capacity of the vehicle, denoted as $C_l$, with the total number of travelers assigned to the vehicle not being able to exceed the capacity. Travelers can be assigned to be transported by a vehicle on a particular route as a result of the processing done by the route evaluator 14, as described further below. The variable $a_{il}$ can represents the assignment of traveler i to vehicle l, with $a_{il} \in \{0,1\}$, and $a_{il}=1$ indicating that traveler i is assigned to vehicle l.

The information 20 further included the schedule of a particular vehicle, which the evaluator 14 assigns to a vehicle based on analysis described below. The schedule can be expressed as $(r_l; t_l)$ be the schedule of vehicle l, where $r_l$ is the route assigned to vehicle l, and $t_l$ is the time the vehicle arrives at the starting station of the route. The time the vehicle 1 will be arriving at any station $s_j \in r_l$ can be computed by the route evaluator 14 as a function of both $r_l$ and $t_l$ denoted $F_j(r_l, t_l)$.

The schedule of the vehicles depends on the the stops that the vehicles must visit and the times when the vehicle must visit those stops. The database 11 stores at least one list 21, 22 of stops where the vehicles can stop. The lists 21, 22 can be separated by geographic locations ("origin stops" 21 and "destination stops" 22 denote lists of stops in different geographic locations); alternatively, all of the stops can be listed in one list. The list includes the location of each of the stops. In one embodiment, each of the stops can be a public transit stop, such as a bus stop. In a further embodiment, other kinds of stops with a fixed location are possible. The complete set of origin stops (or "pickup stops") can be represented as $S^p = \{S_m^p\}$ while the complete set of destination stops ("drop-off stops") can be represented as $S^d = \{S_n^d\}$.

As described below, as a result of the processing by the route evaluator 14, the travelers are assigned to particular stops to be picked up and to be dropped off at. The variable $p_{ij} \in \{0,1\}$ can be made to indicate where traveler i will be picked up at stop $S_j^p$, with the value being 1 indicating that the traveler will be picked up at that stop. $t_{ij}^p$ can represent the time the traveler will be picked up by the assigned vehicle. Similarly, $d_{ij} \in \{0,1\}$ can indicate whether the traveler is going to be dropped off at the stop $s_j^d$, with the value being 1 indicating that the traveler will •off.

In addition, traffic information at a particular time can be obtained from by the server 13 from publicly available sources and thus, driving times 24 between at least some of the stops can be calculated and stored in the database 11 by the route evaluator 14, which once again is used to compute a schedule of a vehicle.

Based on the geographic locations of the stops, and the origin and the destination locations included in the requests 12, the route evaluator 14 calculates walking time 23 between the stops in the lists 21, 22 and the origin and destination locations of one or more included in one or more of the requests, which are stored between the database 11.

The walking time 23 can be denoted using a function dis(•,•). These walking times can be used to identifying the stops that a particular traveler can utilize for transportation and at which the travelers to be transported can be picked up and dropped off, as further described below.

The sequence of stops that a vehicle is assigned to visit is defined by the route assigned to that vehicle. The database 11 stores potential routes 25 that the vehicles can take. A route $r_k$ is a sequence of stations $s_0 \ldots s_1$ and $R=\{r_k\}$ represents the set of possible routes 25. Each route must start at a pickup location ($s_n \in S^p$), end at a drop-off location ($s_j \in S^d$), and once the vehicle stops at a drop-off stop the vehicle cannot revisit a pickup location ($\forall s_i \in r_k, s_i \in S^d \lor \forall j<i\ s_j \in S^p$).

The number of possible routes 25 is a combinatorial of the number of stops being considered. As described in further detail below, the route evaluator 14 can avoid analyzing all possible routes between origin and destination areas in assigning a route to vehicle, which becomes a computational bottleneck when attempting to scale-up the computations to cover a large number of stops, by considering only a minimal set of stops that covers selected travelers. The evaluator 14 can represent each route as a binary vector $R = \langle r_1, \ldots, r_i, \ldots, r_K \rangle$, where $r_i$ indicates whether the stop $s_i$ is included in the route, and K is the total number of stations; thus only those routes which include all of the stops in the set need to be analyzed.

As further described below, the order in which the stops can be visited is limited to avoid backtracking. Given the vector representation, the time a vehicle will arrives at a stop $s_i$ can be derived from the following equation:

$$t_i = t_j + tra(s_j, s_i),$$

where, stop $s_j$ is the last station visited before station $s_i$. Given a route, the route evaluator 14 identifies the last station visited before another station included in the routes. To that end, another set of auxiliary variables $q_{ij}$ are used by the evaluator 14, for each j and i<j, with the set indicating whether the stop $s_i$ is the last station visited before station $s_j$. The route evaluator 14 can identify a time during which each stop will be visited by the following equations:

$$t_j \leq (1-p_{ij}) \cdot MM + (tra(s_j, s_i) + t_i)$$

$$t_j \geq (1-p_{ij}) \cdot NN + (tra(s_j, s_i) + t_i)$$

In the above equations, MM is a pre-defined very large positive value (such as, in one embodiment, 10,000, though other values are also possible, and NN is a pre-defined very small negative value (such as, −10,000, though other values could also be used.). The above two equations ensure that $t_j$ depends only on the time the last stop is visited, as when $p_{ij}=0$, the above two constraints become inactive.

Furthermore, the route evaluator 14 makes sure that each stop can have only one "previous stop":

$$\sum_{i<j} p_{ij} = 1$$

The variables that are used by the evaluator 13 in assigning a vehicle to a particular schedule to pick up particular traveler are summarized in Table 2 below:

| Variables | |
|---|---|
| $a_{il}$ | integer variable for each traveler i and vehicle l, indicating whether traveler i is assigned to vehicle l |
| $b_{lr}$ | integer variable for each vehicle l and route r, indicating whether vehicle l is scheduled to take route r |
| $t_l$ | continuous variable representing the time vehicle l is schedule to start traveling |
| $p_{im}$ | Integer variable for each traveler I and pick up station m, indicating whether traveler i is assigned to pick up station m |
| $d_{in}$ | integer variable for each traveler i and drop off station n, indicating that whether traveler i is assigned to pick up station n |

The route evaluator 14 can optimize the assignments of vehicles to transporting particular travelers on particular schedules by aiming to maximize the result of the function described above in equation (1). The equation (1) is described with greater specificity in equation (2) below:

$$\max \omega_1 \sum_{i,l} a_{il} - \omega_2 \sum_{lr} b_{lr} \cdot tra(r) - \omega_3 \left( \sum_{i,m} dist(s_i, s_m^p) \cdot p_{im} + \sum_{i,n} dist(t_i, s_j^d) \cdot d_{in} \right)$$

In evaluating the result of the function and making the assignments, the route evaluator 14 uses a plurality of constraints 26, such as the constraints given below in equations (3) to (14), though other constraints 26 are possible.

$$\sum_l a_{il} \leq 1, \quad \forall i \quad (3)$$

$$\sum_l a_{il} \leq c_l, \quad \forall l \quad (4)$$

$$\sum_l a_{il} \leq (1 - b_{l0}) \cdot MM, \quad \forall l \quad (5)$$

$$\sum_r b_{lr} = 1, \quad \forall l \quad (6)$$

$$\sum_m p_{im} \leq 1, \quad \forall i \quad (7)$$

$$\sum_m p_{im} \geq \sum_l a_{il}, \quad \forall i \quad (8)$$

$$\sum_n d_{in} \leq 1, \quad \forall i \quad (9)$$

$$\sum_n d_{in} \geq \sum_l a_{il}, \quad \forall i \quad (10)$$

$$t_i^a - (t_l + tra(s_m^p, r)) \leq \quad (11)$$
$$(1 - a_{il}) \cdot MM + (1 - b_{lr}) \cdot MM + (1 - p_{im}) \cdot MM, \forall i, l, r, m$$

$$t_i^a - (t_l + tra(s_m^d, r)) \geq (1 - a_{il}) \cdot MM + (1 - b_{lr}) \cdot MM + (1 - d_{in}) \cdot MM, \quad (12)$$
$$\forall i, l, r, n$$

$$dis(o_i, s_m^p) \leq (1 - p_{i,m}) \cdot MM + \theta, \quad \forall i, m \quad (13)$$

$$dis(e_i, s_n^d) \leq (1 - d_{i,n}) \cdot MM + \theta, \quad \forall i, n \quad (14)$$

Constraint in equation (3) ensures that each traveler can only be assigned to one vehicle. Constraint in equation (4)

guarantees that the total number of travelers assigned to the vehicle cannot exceed the vehicle's capacity.

As not every customer needs to be picked up nor does every vehicle need to serve customers, constraint (5) ensures that no travelers are assigned to vehicles that are not in service (such as vehicles assigned to the null route, r=0.). As mentioned above, MM is a very large constant value making this constraint a conditional constraint as this constraint will only be "activated" when $b_{10}=1$. Constraint (6) maintains that each vehicle must be assigned to a route. Constraint (7) ensures that each traveler can only be assigned to up to one pick up station. 14 Constraint (8) ensures that if the traveler is assigned to a vehicle, the vehicle must be on a route that serves the pickup stop of the traveler. Similar constraints are represented in Inequalities (9) and (10), for the drop-off stop assignments. Constraint (11) guarantees that the assigned vehicle of the traveler cannot depart the pickup station earlier than the desired depart time of the traveler. Constraint (13) ensures the walking distance between the traveler's start location and the assigned pickup stop cannot exceed the threshold. In one embodiment, q=15 to state that no traveler can walk more than 15 minutes to a stop, though other values of q are possible. Similarly Constraints (12) and (14) confine the scheduling of dropping off of the traveler.

In evaluating whether to assign a vehicle to transport particular customers on a particular schedule, the route evaluator 14 can evaluate whether potential routes satisfy particular constraints and calculate a result of equation (2) based on assignments of vehicles to particular routes to particular travelers on particular schedules. The results can be stored as scores 27 and by comparing the scores for different vehicle assignments, the evaluator 14 can determine which assignment has the greatest score 27 and implement that assignment.

The formalization described in equation (2) results in a large search space. The total number of routes is factorial in the number of stops, and each request contributes an additional V+S integer variables, where V is the total number of vehicles and S is the total number of stations. Accordingly, the evaluator 14 implements several heuristics to reduce search space and speed-up computations necessary to assign particular vehicles to particular schedules to transport particular travelers. The heuristics are described in detail below beginning with reference to FIG. 2. Briefly, the heuristics include a heuristic for clustering requests based on their origin and destination location and selecting requests (and travelers) to be serviced based on the clusters, such as described further below with reference to FIG. 3; identifying a set of minimum number of origin stops and destination stops that cover all of the selected travelers, as further described in detail with reference to FIG. 2; and a heuristic for arranging the order in which the stops in the set will be visited. Other heuristics are possible.

Upon making the assignments of particular vehicles to transport particular travelers using particular routes, the route evaluator 14 can notify the travelers and the microtransit vehicles, including the self-driving vehicles 19 that can automatically follow the routes, regarding the assignment and provide directions for the travelers to walk to particular stops using the user devices 16-18.

The at least one server 13 and the user devices 16-18 can each include one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components, and each of the servers can act as a specialized computer. For instance, when the modules are implemented as hardware, that particular hardware is specialized to perform the computations and communication described above and other computers cannot be used. Additionally, when the modules are burned into read-only memory components, the computer storing the read-only memory becomes specialized to perform the computations and communication described above that other computers cannot. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components. For example, the at least one server and the user devices 16-18 can include other components found in programmable computing devices, such as input/output ports, network interfaces, and non-volatile storage, although other components are possible. Also, the at least one server can be dedicated servers or be servers in a cloud-computing environment.

Figure 2:
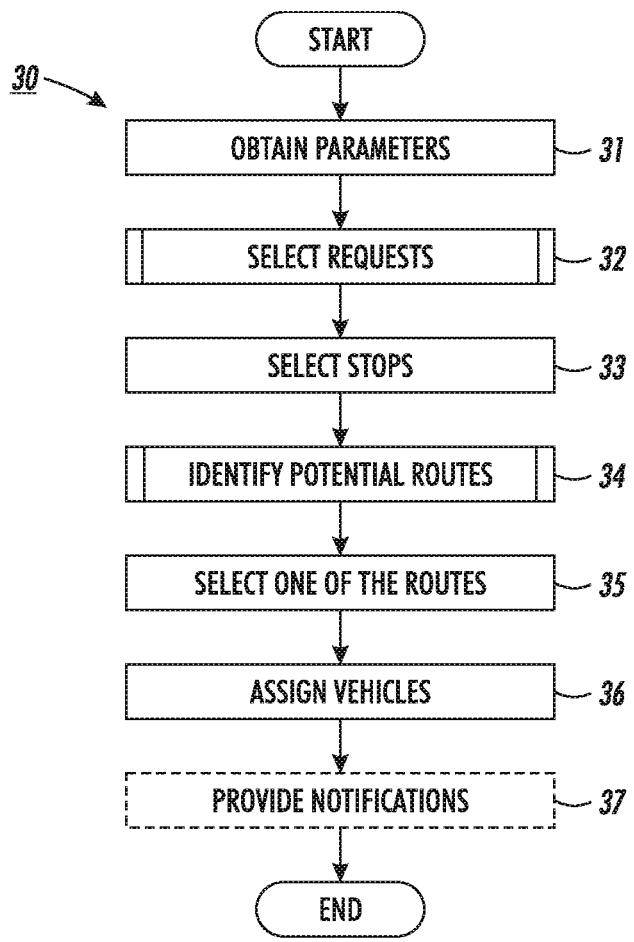
FIG. 2 is a flow diagram showing a computer-implemented method for optimization of on-demand microtransit in accordance with one embodiment.

FIG. 2 is a flow diagram showing a computer-implemented method 50 for optimization of on-demand microtransit in accordance with one embodiment. The method 50 can be implemented using the system of FIG. 1, though other implementations are possible. Parameters for evaluating routes are obtained, including receiving requests for transportation from a plurality of travelers (step 31). Travelers to be serviced by a particular vehicle are selected, as further described with reference to FIG. 3 (step 32). Walking distances are calculated between the stops in the origin area and the origin locations of the selected travelers and the stops in the destination area and the desired destination locations of the selected travelers and based of the walking distances, a set that includes the minimal number of stops that covers all of the selected travelers is selected (step 33). A selected traveler is covered by the set of stops if there is a stop within the maximum permissible walking distance from the origin location and destination location of that traveler. By identifying the minimal set of stops for all of the selected travelers, which can include stops at which more than one traveler is picked up or dropped off, the number of stops that need to be analyzed in subsequent processing is decreased, thus increasing the computational speed at which the analysis can be performed.

Figure 4:
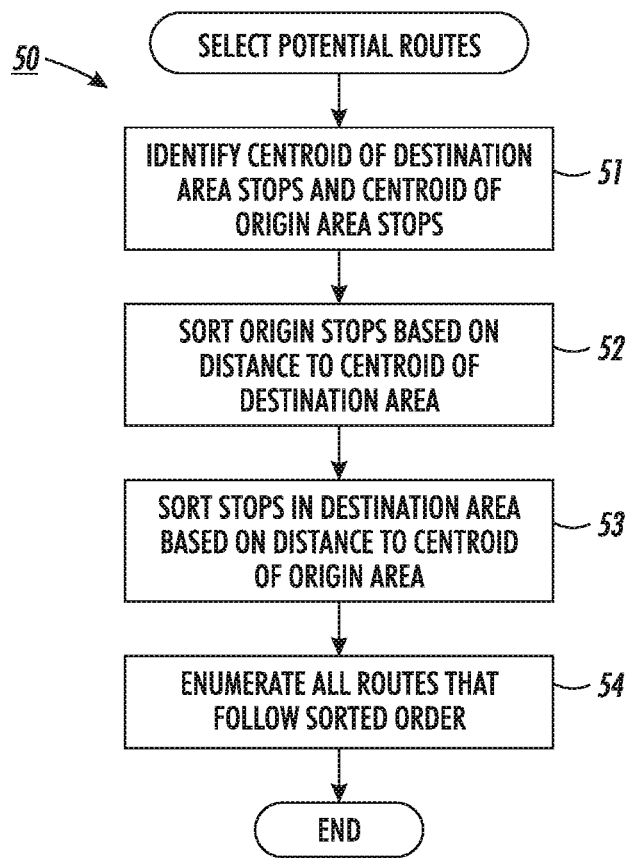
FIG. 4 is a flow diagram showing a routine for identifying possible routes for transporting the selected travelers for use in the method of FIG. 2.

Based on the selected stops, possible routes which a vehicle can take to visit all of the stops are identified, as further described with reference to FIG. 4 (step 34). The identified routes are analyzed based on whether they satisfy all of the constraints, and the route with the highest score that satisfies all of the constraints is chosen (step 35). The vehicle is scheduled to take that route based on the driving times between the stops based on the driving times between the stops and the desired arrival and departure times of the selected travelers (step 36), and the travelers are optionally directed to go to the nearest stop in the set (step 37), ending the method 30.

Figure 3:
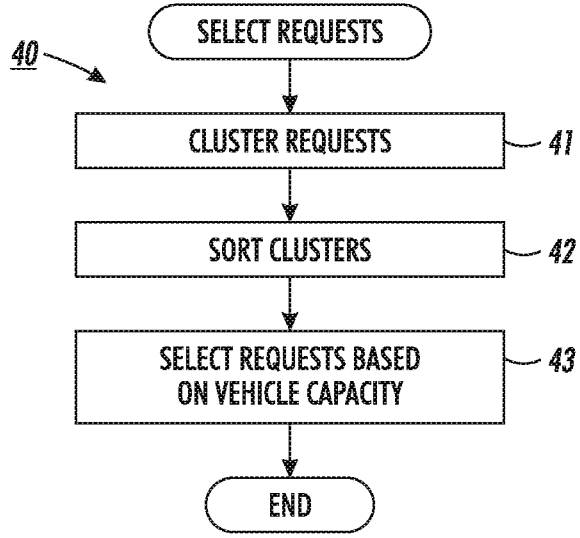
FIG. 3 is a flow diagram showing a routine for selecting travelers to be serviced by a particular vehicle for use in the method of FIG. 2 in accordance with one embodiment.

Travelers in the same location often go to work at a similar time in the morning and grouping the travelers by their starting location can account for both where these travelers need to be picked up and for when they need to be picked up. FIG. 3 is a flow diagram showing a routine 40 for selecting travelers to be serviced by a particular vehicle for use in the method 50 of FIG. 2 in accordance with one embodiment. The received requests are clustered based on the origin locations and destination locations included in the requests (step 41). In one embodiment, the clustering can be k means clustering that is repeated multiple times to improve the resulting clusters. In performing the multiple clustering runs, the k of clustering is be incrementally increased for each subsequent clustering run and distortion for each of the clustering runs is calculated. K continues to be increased and the clustering runs continue to be repeated with the increased k while the distortion continues to improve between the clustering runs by a certain threshold amount, such as by 10%, though other amounts are possible. Other ways to perform the clustering are possible.

The clusters are subsequently sorted by size, the number of the requests in each of the clusters (step 42). Requests are selected from the sorted clusters until the number of travelers exceeds a threshold that is a factor, denoted as $\pi$, of the capacity of the vehicle (step 43). Thus, if the capacity is nine travelers, if the factor $\pi$ is two, the threshold is 18 travelers. The requests are selected from the clusters in the order of decreasing size, with requests from the largest clusters being selected first. Thus, if the threshold is 12 requests and there are clusters of size nine, six, and three requests, initially all nine requests from the first cluster are selected, then the three requests from the second cluster are selected, and no requests are selected from the third cluster. Focusing on spatially clustered travelers greatly reduces the number of stops that must be considered by ignoring customers that were unlikely to be served in an optimal solution due to capacity constraints. From these requests, the vehicles are assigned to people using the constraints of the mixed-integer linear programming described above with reference to FIG. 1 ending the routine 40.

Preventing backtracking between the stops serviced by a vehicle allows to reduce travel time needed to complete a route. FIG. 4 is a flow diagram showing a routine 50 for identifying possible routes for transporting the selected travelers for use in the method 30 of FIG. 2. Initially, the stops in the origin area that were identified as part of the set in step 33 are clustered and a centroid of the origin area cluster is identified; similarly, the stops in the destination area that were identified as part of the set in step 33 are clustered and a centroid of the destination area cluster is identified (step 51). The stops in the set that are in the origin area are sorted based on their distance to the centroid of the destination area (step 52). The stops in the set that are in the destination area are sorted based on their distance to the centroid in the origin area (step 53). Routes that follow the sorted orders are enumerated; thus, in following one of the enumerated routes, a vehicle would have to first visit the stops in the origin stops in the order of decreasing distance to the destination area centroid (visiting the stops furthest from the destination area centroid first) and then visit the destination stops in the order of increasing distance from the origin area centroid (visiting the stops closest to the origin area centroid first). By following the sorted order, the routes can avoid backtracking and thus reduces waste in time and fuel. Further, by not considering the routes that do not follow the sorted order, the search space for possible routes that a vehicle can take to transport the selected travelers is reduced and thus the computational speed can be increased.

The application of the system 10 and method 30 described above provides multiple advantages. Below is a description of the empirical tests of the system 10 and method 30 in accordance with one embodiment.

Commuting data from the American Community Survey (ACS) was used to generate realistic origin-destination pairs along with temporal constraints for all estimated commutes in Los Angeles County for a typical week-day morning (15 million trips). From commuter flow table (A302103), a request for each estimated commuter between census tracts was generated by randomly assigning origin and destination locations within the tracts. Next, using the workplace arrival times table (A202112), a distribution of arrival times for each census tract was created. This distribution was sampled to create an arrival time constraint for each request. Then, the depart after constraint was determined by subtracting two times the driving time between the request's origin and destination. Roughly speaking, an assumption was made that travelers would be willing to have their commute take up to twice as long if they did not have to drive. To evaluate only rush hour solutions, only requests where the arrival time is between 8 am and 10 am were considered. The Open Source Routing Machine (OSRM; available at http://project-osrm.org/) and Open Street Maps, described by Haklay, et al., Openstreetmap: User-generated street maps. Pervasive Computing, 21 IEEE, Vol. 7, No. 4, 2008, pp. 12-18, the disclosure of which is incorporated by reference, were used compute the walking and driving times between the different locations as required by the formulation, though other walking and driving times calculators could also be used.

Experiments were conducted to evaluate the set cover and travel heuristic independently, and then an experiment was conducted with the set cover and the travel heuristics together to explore clustering heuristic on realistic problems. Due to the size of the problems, the clustering heuristic was not explored independently because of the prohibitive number of stops and routes involved in such evaluating such as a scenario.

For the set cover and travel heuristics, we generate problems between the following pairs of locations: La Brea→Westwood, Santa Monica→Westwood, Manhattan Beach→La Brea, and La Brea→Downtown. These flows include between 11 (Manhattan Beach→La Brea) and 418 (La Brea→Downtown) rush hour commuters and between 23 (La Brea) and 1346 (Downtown) potential stops.

The problems were generated by varying the number of requests between two and five selecting them at random from all the requests between the areas. Next, we select stops by identifying the closest stop to the origin and destination of each requests. Therefore, a problem with two requests will have at most two pickup stops and two drop-off stops. For each number of requests, five different problems were generated and computation performance with each heuristic was compared against a baseline system without any heuristics.

For the spatial clustering heuristic, we want to assess the performance of the system on 5 realistic problems. Therefore, we required commute flows with at least 50 rush hour commuters. Therefore, we used the following flows: La Brea→Westwood (54 commutes), Manhattan Beach→Westwood (58 commutes),Westwood→SantaMonica (83), and SantaMonica→Westwood (134). The number of stops in these areas range from 23 in La Brea to 53 in Santa Monica.

The number of requests were varied from 20 to 50 in increments of 10. For each number of requests, the problems were generated by randomly sampling requests from between the areas and including all of the stops within each area as potential pickup points and drop-off points respectively. The microtransit provider was assumed to be operating a single 6-passenger vehicle that begins in a random location in the origin area. In this case, the performance was compared between selecting 6 (clustering $\pi$=1) requests and 12 requests (clustering π=2) from the clusters. The performance was measured in terms of solution time and objective value.

For each of these trials, the GLPK solver (available at http://www.gnu.org/software/glpk/) as part of the SageMath software package (Stein, W. et al., Sage Mathematics Software (Version 6.7.0), The Sage Development Team, 2015, available at http://www.sagemath.org), though other solvers could also be used. A timeout of 30 seconds was used on the solution time which removed roughly 7% of the trials from the analysis.

Figure 5A:
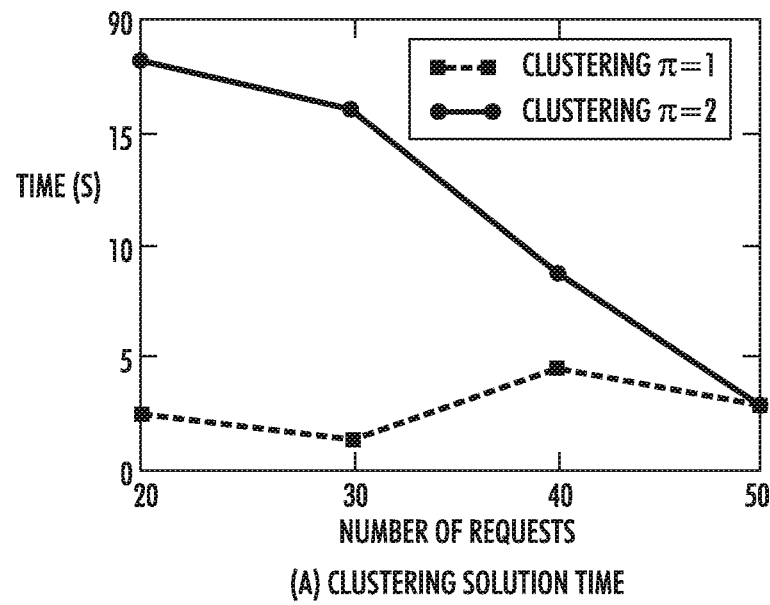
FIGS. 5A-5F show empirical results of evaluation of different heuristics employed by the system of FIG. 1 and method of FIG. 2.
Figure 5B:
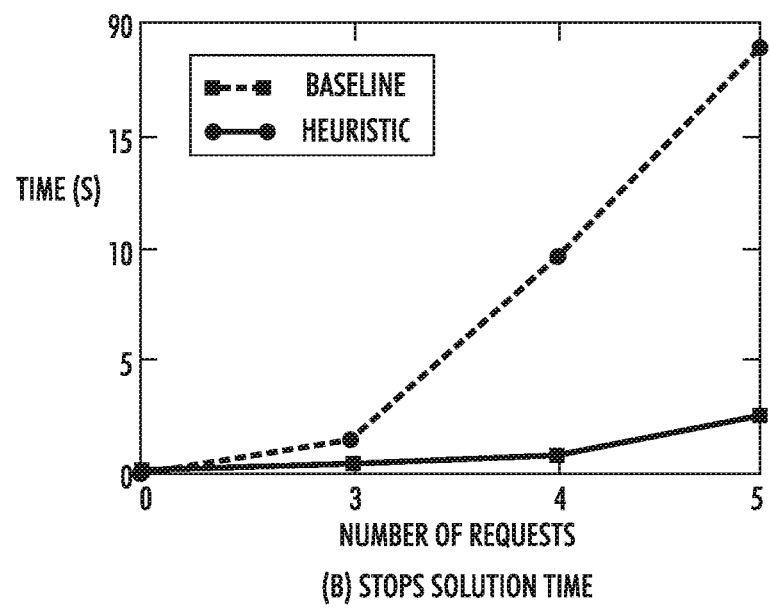
Figure 5C:
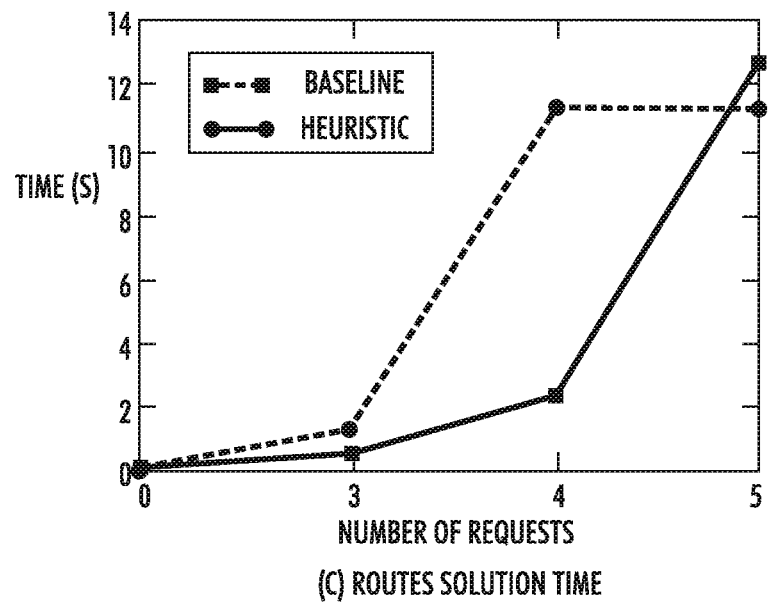
Figure 5D:
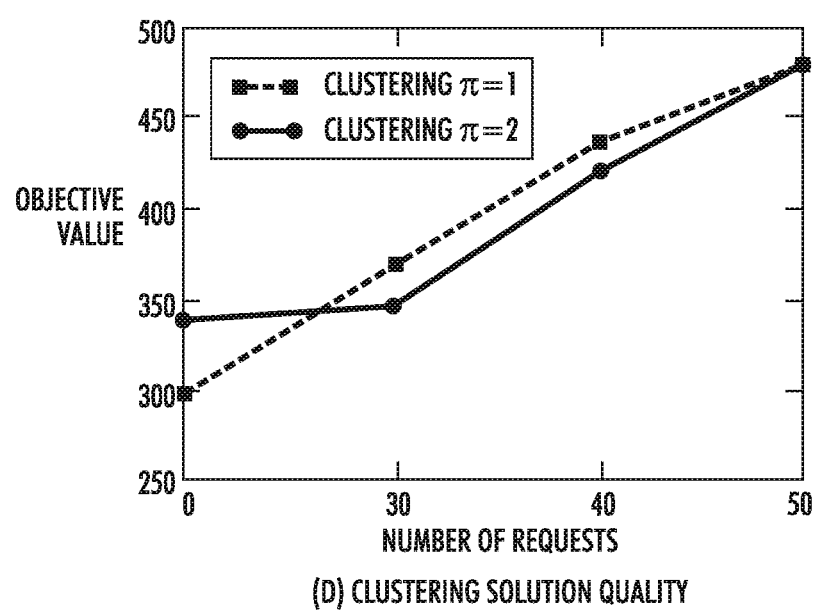

FIG. 5A-F show empirical results of evaluation of different heuristics employed by the system 10 of FIG. 1 and method 30 of FIG. 2. FIGS. 5A and 5D show that by clustering the requests and employing the other two heuristics, the problems involving tens of requests can be solved in less than five seconds. While system performance improves with more requests, the solution time staying low remains an important concerns because the k means clustering time is dominated by the rest of the algorithm and the requests considered after clustering lead to better solutions if there are more initial requests. That is, with more requests in a fixed area, the likelihood is greater that the clusters will be denser. Therefore, the same number of travelers requires less stops to cover.

Figure 5E:
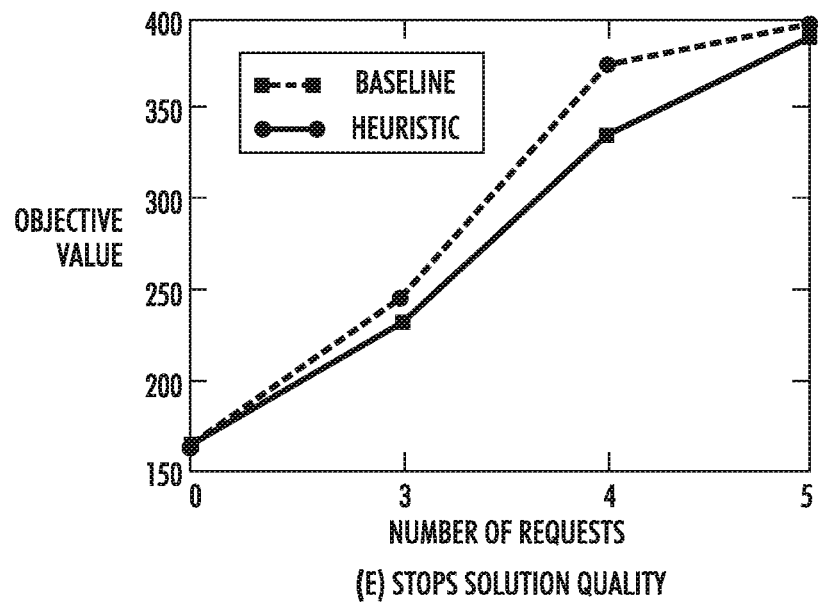
Figure 5F:
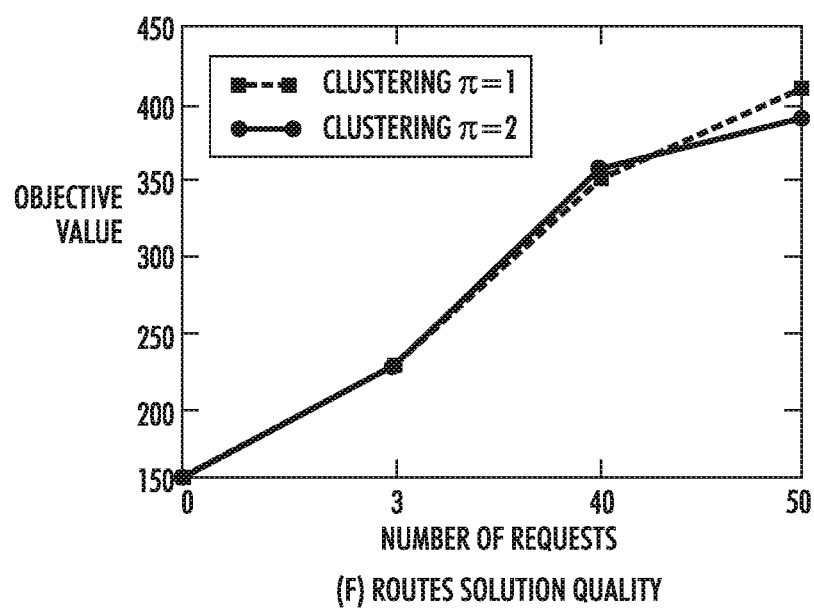

FIGS. 5B and 5E illustrate the tradeoffs of the stop selection heuristic. By including only the minimal set of stops, travelers end up walking farther, thus reducing the solution quality. On the positive side, the number of routes considered is factorial in the number of stops, therefore this heuristic significantly improves the solution time. FIGS. 5C and 5F illustrate the tradeoffs of the route selection heuristic. The surprisingly low value for solution time in the five requests trial of the baseline condition is due to the fact that the system exceeded the timeout on 80% of these problems, while in the heuristic condition, the system solved them all. Overall, the route selection heuristic appears to have minimal impacts on solution quality, but the solution time benefits, while significant, are less pronounced than with stop selection heuristic.

While the invention has been particularly shown and described as referenced to the embodiments thereof, those skilled in the art will understand that the foregoing and other changes in form and detail may be made therein without departing from the spirit and scope of the invention.

What is claimed is:

1. A method for optimization of on-demand microtransit, comprising:
   maintaining a list of possible stops of one or more self-driving vehicles;
   receiving a plurality of requests for transportation, each of the requests associated with at least one traveler and comprising an origin location, a desired destination location, an earliest permitted departure time from the origin location and a latest permitted arrival time to the destination;
   selecting multiple ones of the requests for fulfillment, comprising:
      grouping the requests into a plurality of clusters based on the origin location and the destination location in each of the clusters;
      sorting the clusters based on their size;
      setting a threshold number that is a multiple of a capacity of one of the self-driving vehicles; and
      selecting the requests from the clusters based on the size of the clusters up to the travelers associated with the selected requests equaling the threshold number, wherein the requests are selected from the clusters in an order of decreasing size of the clusters and all of the requests from a larger one of the clusters are selected prior to selecting the requests from a smaller one of the clusters;
   selecting a set of a minimal number of the stops, the set comprising at least one stop that is within a predefined walking distance of the origin location of each of the selected travelers and at least one stop within the predefined walking distance of the destination location of each of the selected travelers;
   identifying potential routes for the self-driving vehicles that include the stops in the set, comprising:
      clustering the stops in the set within the walking distance of the origin locations and identifying a centroid of the origin stops cluster;
      clustering the stops in the set within the walking distance of the destination locations and identifying a centroid of the destination stops cluster;
      sorting the stops in the set within the walking distance of the origin locations in order of decreasing distance to the destination stops centroid;
      sorting the stops in the set within the walking distance of the destination locations in order of increasing distance to the origin stops centroid; and
      enumerating all of the potential routes that follow the sorted orders of the stops;
   evaluating as a mixed integer linear problem possible assignments of at least some of the travelers associated with the selected requests to be transported by one or more of the self-driving vehicles along at least one of the enumerated routes, comprising:
      determining a total travel time by the one or more self-driving vehicles associated with each of the possible assignments based on at least one of one or more of the earliest permitted departure times and one or more of the latest permitted arrival times;
      determining a total number of the travelers whose requests would be fulfilled by each of the possible assignments;
      determining a total walking time of the at least some travelers associated with each of the possible assignments; and
      using the total travel time associated with each of the possible assignments, the total number of travelers associated with each of the possible assignments, and the total walking time associated with each of the possible assignment to select one of the possible assignments; and
   causing one or more of the self-driving vehicles associated with the selected assignment to automatically follow the at least one route associated with the selected assignment via a wireless transceiver comprised in the one or more self-driving vehicles, wherein the steps are performed by a suitably-programmed computer.

2. A method according to claim 1, wherein the grouping is performed using k means clustering, further comprising:
   performing an clustering of the requests using a value of k;
   calculating a distortion of the initial clustering;
   increasing the value of k and repeating the clustering using the increased value of k;
   calculating a distortion for the initial clustering and calculating a difference between the initial clustering distortion and the repeated clustering distortion based on the comparison; and comparing the difference to a threshold and upon the difference meeting the threshold, further increasing the value of k and further repeating the clustering using the further increased value of k.

3. A method according to claim 1, wherein the total travel time associated with each of the possible assignments, the total number of travelers associated with each of the possible assignments, and the total walking time associated with each of the possible assignments are weighed differently during the evaluation.

4. A method according to claim 1, further comprising:
evaluating whether the possible assignments satisfy a plurality of constraints,
wherein the selected assignment satisfies all of the constraints.

5. A method according to claim 1, wherein each of the possible stops is a public transportation stop.

6. A method according to claim 1, further comprising:
calculating a walking distance between the origin location of each of the selected travelers to each of the stops in the set; and
directing each of the selected travelers to the stop in the set that is within a minimal walking distance from that traveler's origin location.

7. A system for optimization of on-demand microtransit, comprising:
a processor configured to execute code and configured to:
maintain a list of possible stops of one or more self-driving vehicles;
receive a plurality of requests for transportation, each of the requests associated with at least one traveler and comprising an origin location, a desired destination location, an earliest permitted departure time from the origin location and a latest permitted arrival time to the destination;
select multiple ones of the requests for fulfillment, further comprising:
group the requests into a plurality of clusters based on the origin location and the destination location in each of the clusters;
sort the clusters based on their size;
set a threshold number that is a multiple of a capacity of one of the self-driving vehicles; and
select the requests from the clusters based on the size of the clusters up to the travelers associated with the selected requests equaling the threshold number, wherein the requests are selected from the clusters in an order of decreasing size of the clusters and all of the requests from a larger one of the clusters are selected prior to selecting the requests from a smaller one of the clusters;
select a set of a minimal number of the stops, the set comprising at least one stop that is within a predefined walking distance of the origin location of each of the selected travelers and at least one stop within the predefined walking distance of the destination location of each of the selected travelers;
identify potential routes for the self-driving vehicles that include the stops in the set, comprising:
cluster the stops in the set within the walking distance of the origin locations and identify a centroid of the origin stops cluster;
cluster the stops in the set within the walking distance of the destination locations and identify a centroid of the destination stops cluster;
sort the stops in the set within the walking distance of the origin locations in order of decreasing distance to the destination stops centroid;
sort the stops in the set within the walking distance of the destination locations in order of increasing distance to the origin stops centroid; and
enumerate all of the potential routes that follow the sorted orders of the stops;
evaluate as a mixed integer linear problem possible assignments of at least some of the travelers associated with the selected requests to be transported by one or more of the self-driving vehicles along at least one of the enumerated routes, comprising:
determine a total travel time by the one or more vehicles associated with each of the possible assignments based on at least one of one or more of the earliest permitted departure times and one or more of the latest permitted arrival times;
determine a total number of the travelers whose requests would be fulfilled by each of the possible assignments;
determine a total walking time of the at least some travelers associated with each of the possible assignments; and
use the total travel time associated with each of the possible assignments, the total number of travelers associated with each of the possible assignments, and the total walking time associated with each of the possible assignment to select one of the possible assignments; and
cause one of more of the self-driving vehicles to automatically follow the at least one route associated with the selected assignment via a wireless transceiver comprised in the one or more of the self-driving vehicles.

8. A system according to claim 7, wherein the grouping is performed using k means clustering, the processor further configured to:
perform a clustering of the requests using a value of k;
calculate a distortion of the initial clustering;
increase the value of k and repeating the clustering using the increased value of k;
calculate a distortion for the initial clustering and calculating a difference between the initial clustering distortion and the repeated clustering distortion based on the comparison; and
compare the difference to a threshold and upon the difference meeting the threshold, further increasing the value of k and further repeating the clustering using the further increased value of k.

9. A method according to claim 1, wherein the total travel time associated with each of the possible assignments, the total number of travelers associated with each of the possible assignments, and the total walking time associated with each of the possible assignments are weighed differently during the evaluation evaluation.

10. A system according to claim 7, the processor further configured to:
evaluate whether the possible assignments satisfy a plurality of constraints,
wherein the selected assignment satisfies all of the constraints.

11. A system according to claim 7, wherein each of the possible stops is a public transportation stop.

12. A system according to claim 7, the processor further configured to:

calculate a walking distance between the origin location of each of the selected travelers to each of the stops in the set; and direct each of the selected travelers to the stop in the set that is within a minimal walking distance from that traveler's origin location.

* * * * *